(12) United States Patent
Shichijoh et al.

(10) Patent No.: US 8,227,952 B2
(45) Date of Patent: Jul. 24, 2012

(54) IPM TYPE OF SYNCHRONOUS MACHINE

(75) Inventors: Akiya Shichijoh, Yatomi (JP); Shin Kusase, Oobu (JP); Yuya Mizuma, Gamagoori (JP); Satoshi Ito, Oobu (JP)

(73) Assignee: Denso Corporation, Kariya (JP)

( * ) Notice: Subject to any disclaimer, the term of this patent is extended or adjusted under 35 U.S.C. 154(b) by 369 days.

(21) Appl. No.: 12/272,104

(22) Filed: Nov. 17, 2008

(65) Prior Publication Data
US 2009/0134732 A1    May 28, 2009

(30) Foreign Application Priority Data
Nov. 16, 2007  (JP) ................. 2007-297866

(51) Int. Cl.
H02K 21/16    (2006.01)
(52) U.S. Cl. ......... 310/156.53; 310/156.07; 310/156.38; 310/156.45; 310/156.57
(58) Field of Classification Search ............. 310/156.53, 310/156.07, 156.38, 156.45, 156.57
See application file for complete search history.

(56) References Cited

U.S. PATENT DOCUMENTS

| | | | | |
|---|---|---|---|---|
| 5,838,086 | A * | 11/1998 | Cuenot et al. ............ | 310/156.53 |
| 6,703,745 | B2 * | 3/2004 | Chu .......................... | 310/156.45 |
| 6,717,314 | B2 * | 4/2004 | Horst et al. ............... | 310/156.43 |
| 6,727,627 | B1 * | 4/2004 | Sasaki et al. .................. | 310/211 |
| 6,794,784 | B2 * | 9/2004 | Takahashi et al. ........ | 310/156.56 |
| 6,803,692 | B2 * | 10/2004 | Hattori et al. ............ | 310/156.53 |
| 6,836,045 | B2 | 12/2004 | Murakami et al. | |
| 7,057,322 | B2 * | 6/2006 | Araki et al. ............... | 310/156.53 |
| 7,151,335 | B2 * | 12/2006 | Tajima et al. ............ | 310/156.48 |
| 7,170,209 | B2 * | 1/2007 | Araki et al. ............... | 310/156.47 |
| 7,791,236 | B2 * | 9/2010 | Liang et al. ............... | 310/156.07 |
| 2005/0146233 | A1 * | 7/2005 | Miyawaki ..................... | 310/49 R |
| 2005/0200223 | A1 * | 9/2005 | Tajima et al. ............. | 310/156.46 |
| 2006/0028082 | A1 * | 2/2006 | Asagara et al. ........... | 310/156.53 |
| 2006/0043812 | A1 * | 3/2006 | Cheong et al. ............ | 310/156.53 |
| 2006/0087189 | A1 * | 4/2006 | Matsunobu et al. ...... | 310/156.45 |
| 2006/0186742 | A1 * | 8/2006 | Miyawaki .................... | 310/49 R |

(Continued)

FOREIGN PATENT DOCUMENTS
JP    2000-060038    2/2000
(Continued)

OTHER PUBLICATIONS
Machine translation of foreign document JP 2006304546.*

(Continued)

*Primary Examiner* — Quyen Leung
*Assistant Examiner* — Alex W Mok
(74) *Attorney, Agent, or Firm* — Nixon & Vanderhye PC (57) ABSTRACT

A synchronous machine comprises a stator and a rotor that faces the stator and rotates on a shaft thereof in a circumferential direction. The rotor has magnetic salient poles that generate reluctance torque and magnet-originating magnetic poles that generate magnet torque by using permanent magnets embedded in the rotor. The machine comprises means for shifting a magnetically substantial central position of magnetic flux emanating from the permanent magnets in the circumferential direction, by an electrical angle π/2 plus a predetermined angle Δθ, from a reference position taken as a central position between paired magnetic salient poles composing each magnetic pole of the machine among the magnetic salient poles. Hence a maximum amplitude of a sum between a harmonic component of the magnet torque and the reluctance torque is changed from that obtained at the reference position without the shift.

20 Claims, 10 Drawing Sheets

U.S. PATENT DOCUMENTS

| | | | | |
|---|---|---|---|---|
| 2006/0279166 A1* | 12/2006 | Takeuchi | | 310/268 |
| 2007/0052313 A1* | 3/2007 | Takahashi et al. | | 310/156.53 |
| 2007/0145850 A1* | 6/2007 | Hsu | | 310/156.56 |
| 2007/0210664 A1* | 9/2007 | Matsunobu et al. | | 310/156.53 |
| 2007/0228862 A1* | 10/2007 | Welchko et al. | | 310/156.53 |
| 2008/0179980 A1* | 7/2008 | Dawsey et al. | | 310/156.53 |
| 2008/0231135 A1* | 9/2008 | Suzuki et al. | | 310/156.53 |

FOREIGN PATENT DOCUMENTS

| | | |
|---|---|---|
| JP | 2001-095182 | 4/2001 |
| JP | 2001-339922 | 12/2001 |
| JP | 2002-044889 | 2/2002 |
| JP | 2002-044920 | 2/2002 |
| JP | 2003-324875 | 11/2003 |
| JP | 2004104962 A * | 4/2004 |
| JP | 2006-304546 | 11/2006 |

OTHER PUBLICATIONS

Chinese Office Action dated Dec. 8, 2010, issued in corresponding Chinese Application No. 200810187798.X with English Translation.

* cited by examiner

<RELATIONSHIP BETWEEN AMOUNT OF MAGNET AND TORQUE>

FIG. 7

ROTOR SAMPLE 1
(AMOUNT OF MAGNET IS 33% TO THE CONVENTIONAL ROTOR)

FIG. 8

ROTOR SAMPLE 2
(AMOUNT OF MAGNET IS 50% TO THE CONVENTIONAL ROTOR)

FIG. 9

ROTOR SAMPLE 3
(AMOUNT OF MAGNET IS 100% TO THE CONVENTIONAL ROTOR)

FIG.10
PRIOR ART

ROTOR SAMPLE 4
(THE CONVENTIONAL ROTOR)

IPM TYPE OF SYNCHRONOUS MACHINE

CROSS REFERENCES TO RELATED APPLICATION

The present application relates to and incorporates by reference Japanese Patent Application No. 2007-297866 filed on Nov. 16, 2007.

BACKGROUND OF THE INVENTION

1. Technical Field

The present invention relates to an IPM (Interior Permanent Magnet) type of synchronous machine, and in particular, to an IPM type of synchronous machine that generates magnet torque and reluctance torque.

2. Related Art

There has been known a synchronous machine that generates magnet torque and reluctance torque (hereinafter, such a synchronous machine will now be referred to as a reluctance-parallel-use magnet synchronous machine). One of the most familiar reluctance-parallel-use magnet synchronous machines is an IPM (Interior Permanent Magnet) type of synchronous motor.

The reluctance torque Tr is obtained when there is provided a difference between q-axis inductance Lq and d-axis inductance Ld. Because the magnetic resistance of a permanent magnet is higher, the q-axis inductance Lq is usually made larger in strength than the d-axis inductance Ld. However, this is not the only possible structure. The d-axis inductance Ld may be made larger in strength than the q-axis inductance Lq.

In the normally used structure where the intensity of the q-axis inductance Lq is larger than that of the d-axis inductance Ld, magnetic salient poles are arranged at the q-axis positions and permanent magnets are arranged at the d-axis positions in order to increase the intensity of the q-axis inductance Lq.

The magnetic salient poles can be realized by a structure where the outer surface of a rotor made of soft magnetism material is made spatially salient in the radially outward at every electrical angle π. In addition, the magnetic salient poles can also be realized by embedding flux barriers within a cylindrical stator made of soft magnetism material. Examples of the reluctance-parallel-use magnet synchronous machine are shown for example in Japanese Patent Application Laid-open Publications No. 2000-60038, 2001-339922, 2002-44920 and 2003-324875. It is widely known that the reluctance-parallel-use magnet synchronous machine has the capability of generating reluctance torque Tr as well as magnet torque Tm, whereby torque, i.e., output per body weight is larger.

However, the conventional reluctance-parallel-use magnet IS synchronous machine is not sufficient in that, for increasing the output torque, the machine is obliged to use a larger amount of rare-earth magnet, which is very expensive.

SUMMARY OF THE INVENTION

The present invention has been made in consideration of the foregoing conventional technique, and an object of the present invention is to provide a synchronous machine that is able to increase output torque, with suppressing an amount of usage of magnet from increasing.

In order to achieve the object, a synchronous machine of the present invention comprises a stator having a cylindrical shape having an axial direction, a radial direction, and a circumferential direction; a rotor that faces the stator and rotates on a shaft thereof in the circumferential direction, the rotor having magnetic salient poles that generate reluctance torque and magnet-originating magnetic poles that generate magnet torque by using permanent magnets embedded in the rotor; and means for shifting a magnetically substantial central position of magnetic flux emanating from the permanent magnets in the circumferential direction, by a predetermined angle $\Delta\theta$, from a reference position taken as a central position between paired magnetic salient poles composing each magnetic pole of the machine among the magnetic salient poles, whereby a maximum amplitude of a sum between a harmonic component of the magnet torque and the reluctance torque is changed from a maximum amplitude of a sum between the harmonic component of the magnet torque and the reluctance torque both obtained at the reference position without the shift.

BRIEF DESCRIPTION OF THE DRAWINGS

In the accompanying drawings.

DETAILED DESCRIPTION OF PREFERRED EMBODIMENTS

Hereinafter, referring to the accompanying drawings, IPM type of synchronous machines according to various embodiments and modifications of the invention will now be described.

In the following embodiments and modifications, a partial model per magnetic pole of the inner rotor of a multiple-pole interior permanent magnet type of synchronous machine However this is not the only example, and the rotor can be altered adequately in terms of the number of rotor magnetic poles and/or rotor types. The synchronous machine is described as a synchronous motor in the present embodiment, but not limited to the motor.

(First Embodiment)

Figure 1:
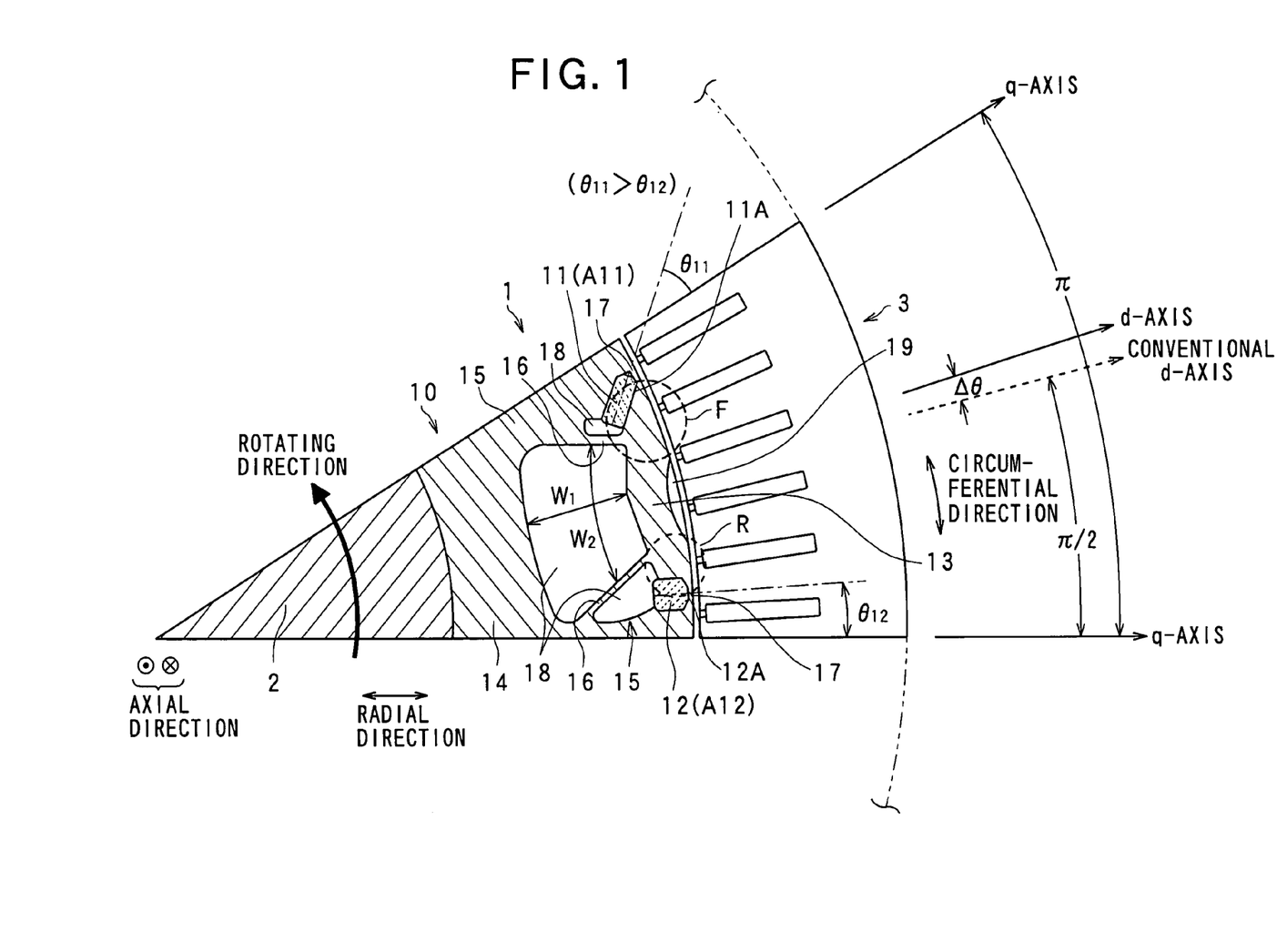
FIG. 1 is a partial cross-sectional view of an IPM type (and inner rotor type) of synchronous machine according to a first embodiment of the present invention, which view is sectioned in the axial direction of the machine.
Figure 2A:
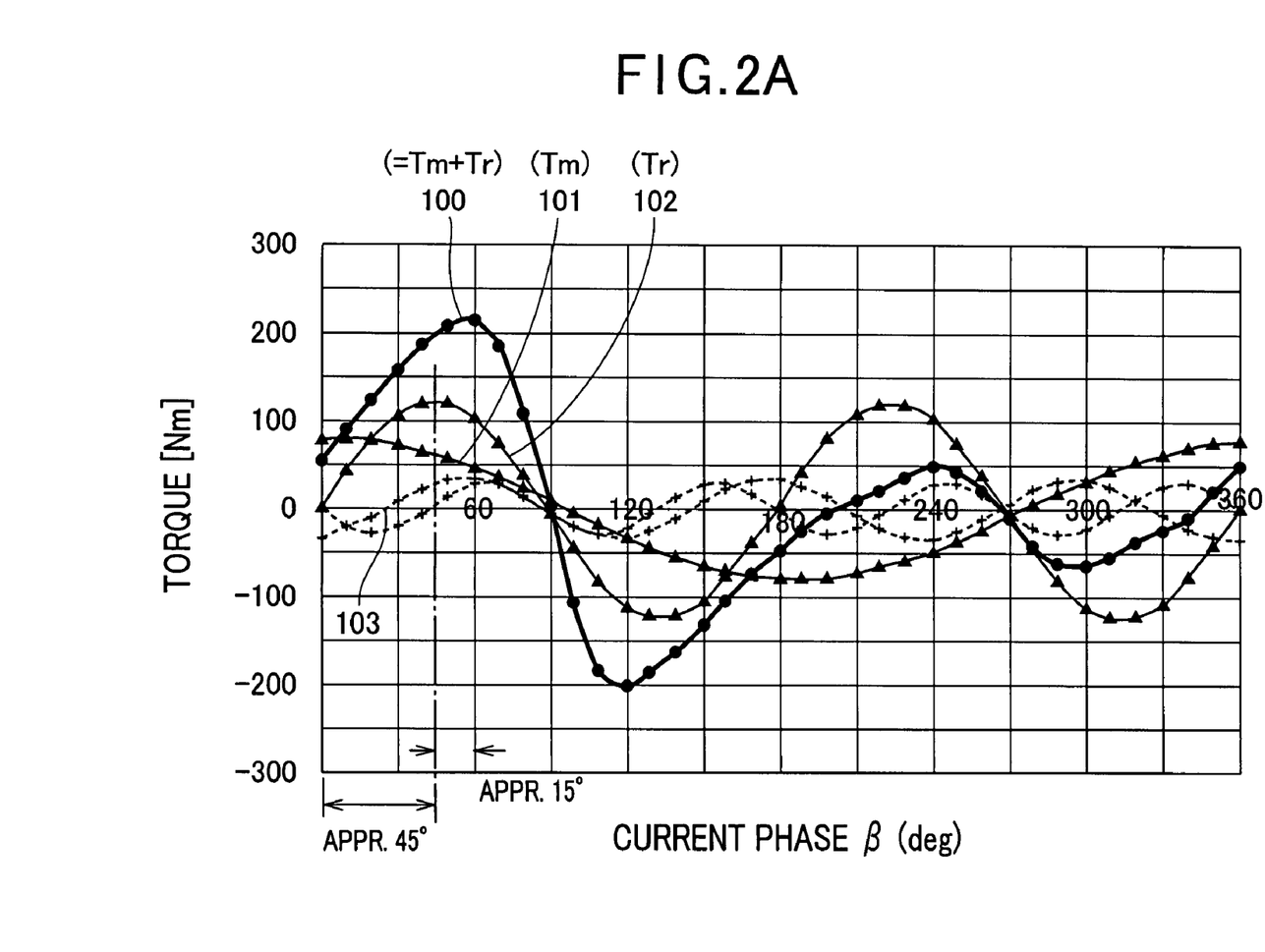
FIG. 2A shows an example of both magnet torque and reluctance torque which are obtained from a rotor shown in FIG. 1.
Figure 2B:
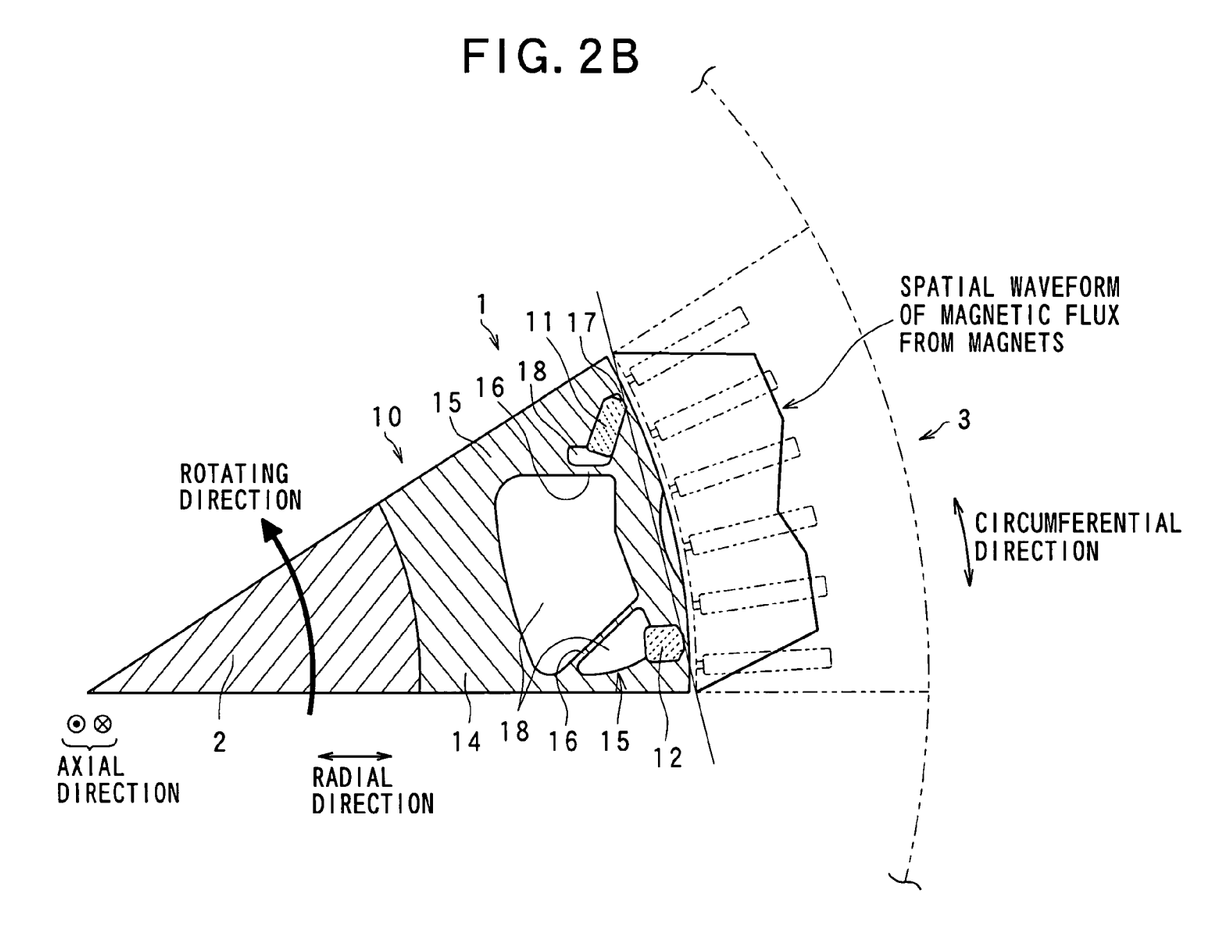
FIG. 2B exemplifies the trapezoidal shape of a spatial distribution of magnetic flux from permanent magnets used in the first embodiment.

Referring to FIGS. 1-2, an interior permanent magnet (IPM) type of synchronous machine according to a first embodiment of the present invention will now be described FIG. 1 is a partial sectional view of the rotor of the synchronous machine, which is cut in the axial direction thereof, to show the inside partial structure of the rotor.

In the structure shown in FIG. 1, there are a rotor 1, a rotation shaft 2, and a stator 3. The stator 3 is provided with a stator core with slots and tooth formed on its inner surface and a stator coil wound in the slots. Since such a stator core structure is known, its detailed description will be omitted here.

The rotor 1 is provided with a rotor core 10 made of soft magnetism material, frontal permanent magnets 11, rear permanent magnets 12, and segments made of soft magnetism material. In the present embodiment, the "frontal, front, or front side" and "rear or rear side" are defined in a rotating direction (a counter clockwise direction in FIG. 1) such that the head in the rotating direction is referred to as a front.

The rotor core 10 is provided with a yoke portion 14 formed into an approximate cylinder secured on the rotation shaft 2 and made of soft magnetism material, In addition to magnetic salient poles 15, spoke portions 16, and connecting portion 17. As shown in FIG. 1, each magnetic salient pole 15 protrudes from the outer surface of the cylindrical yoke portion 14 in a radially outward direction toward the stator Each of the spoke portions 16 rigidly connects the outer portion of the yoke portion and each segment 13. Each of the connecting portions 17 rigidly connects both frontal and rear ends of each segment 13 to a side surface of the tip end of each magnetic salient pole 15 Every electrical angle of $\pi$, a combination of one magnetic salient pole 15, two spoke portions 16, one segment 13, and one connecting portion 17 is provided together with the yoke portion 14. The segments 13, yoke portion 14, spoke portions 16 are made of a plurality of magnetic steel sheets punched into a predetermined shape and laminated on one another so as to form a unified member.

Each segment 13 is positioned between two magnetic salient poles 15, which are separated by an electric angle of $\pi$ from each other in the circumferential direction and faces the inner circumferential surface of the stator 3 with a small gap formed therebetween. On a central part, but closer to the circumferential rear, of each segment 13 in the rotating direction, there is formed a concave groove 19 extending in the axial direction.

Each of the frontal permanent magnet 11 is located on the radially inner side of the connecting portion 17 and sandwiched between the front end of a segment 13 in the rotational direction and a side end face of the magnetic salient pole 15 that faces the front end of the segment 13.

Each of the rear permanent magnet 12 is located on the radially Inner side of the connecting portion 17 and sandwiched between the rear end of a segment 13 in the rotational direction and a side end face of the magnetic salient pole 15 that faces the rear end of the segment 13.

The yoke portion 14, the two magnetic salient poles 15, the segment 13, and the two permanent magnets 11 and 12 are located to section a space, which composes an inter-segment/yoke non-magnetic portion 18. That is, this portion 18 is located between the base portions of a pair of magnetic salient poles 15 and 15 which are adjacent to each other in the circumferential direction so as to have a predetermined width WI between the segment 13 and the outer circumferential surface of the yoke portion 14 in the radial direction. This inter-segment/yoke non-magnetic portion 18 may be filled with resin or non-magnetic metal.

Both frontal and rear permanent magnets 11 and 12, which face the segment 13, provide magnetic faces 11A and 12A having the same magnetic pole. The frontal permanent magnet 11 is larger in its appearance than the rear permanent magnet 12, so that the front one 11 is able to give the segment 13 a larger amount of magnetic flux than that the rear permanent magnet 12 The magnetic face 11A of the frontal permanent magnet 11, which faces the segment 13, is larger in area A (A11, A12) and arrangement angle $\theta$ ($\theta$11, $\theta$12) than the magnetic face 12A of the rear permanent magnet 12, which also faces the segment 13 The arrangement angle A11 and A12 are measured from the radial direction of the synchronous machine which is taken as a basis.

As a result, of the outer circumferential faces of the segment 13 that faces the stator 3, a circumferential frontal potion F is magnetized more strongly than a circumferential rear portion R. Because of this imbalance of the magnetization, the circumferential frontal portion F of this segment gives the stator 3 an amount of magnetic flux larger than the circumferential rear portion R.

The spoke portions 16 can be made up of soft-magnetism material or non-magnetic material. Further, the spoke portions 16 can be made of laminated magnetic steel sheets, These spoke portions 16 may be members integrated with the yoke portion 14 and the segment 13 or may be produced as members whose ends fit with the yoke portion 14 and the segment 13, respectively, which are produced as separate members from each other. This pair of spoke portions 16 and 16 has a width W2 therebetween in the circumferential direction, and this width W2 is set such that the width W2 at an axial outer position is smaller than that at an axial inner position. In this example, the width W2 becomes smaller gradually as the position advances outward in the axial direction.

In this synchronous motor, like the conventional magnetic synchronous machine, supplying currents of rotation vectors to the stator coils will allow the motor to rotate in synchronization with its magnetic angular speed of rotation.

<Basic Concept Of The Present Invention>

Herein, referring to FIG. 2A, the basic concept of the present invention will now be described.

The amplitude of magnet torque Tm generated by the magnet-originating magnetic poles changes one cycle while a phase angle between the vector of stator current or a rotating magnetic filed produced by the stator current and the circumferential central position of magnet-originating magnetic poles changes from $-\pi$ to $+\pi$ This change is known and can be presented as a magnet torque waveform. Likewise, the amplitude of reluctance torque Tr generated primarily when the magnetic salient poles Is lower in its magnetic resistance (i.e., higher in its inductance) changes two cycles while a phase angle between the vector of stator current or a rotating magnetic filed produced by the stator current and the circumferential central position of magnetic salient poles changes from −π to +π. This change is known and can be presented as a reluctance torque waveform In the conventional IPM, the circumferential central position of magnetic salient poles 15 is normally taken as a q-axis, while the circumferential central position of magnet-originating magnetic poles is normally taken as a d-axis which is separated from the q-axis by an electrical angle of π/2. The torque T (=Tm+tr) produced by synthesizing the magnet torque Tm and the reluctance torque Tr is exemplified in FIG. 2A, where the synthesized torque T is shown by a waveform 100. In FIG. 2A, a waveform 101 shows the fundamental component of the magnet torque Tm, a waveform 102 shows the fundamental component of the reluctance torque Tr. The fundamental component of the magnet torque Tm has the first-order frequency, whilst the fundamental component of the reluctance torque has the second-order frequency, that is, the second harmonics.

When considering the fact that the reluctance torque Tr is produced primarily due to small amounts of the magnetic resistance of magnetic salient poles, It is known from FIG. 2A that the reluctance torque waveform is shifted right or left in FIG. 2A by changing the phase angle of the circumferential central position of the magnetic salient poles relatively to the stator current vector, This means that, in FIG. 2A, shifting the reluctance torque waveform right or left relatively to the magnet torque waveform results in changes in the synthesized waveform of the reluctance and magnet torque waveforms. That is, shifting the circumferential central position of any one of the go magnet-originating magnetic poles and the magnetic salient poles to the other makes it possible to change the amplitude of the synthesized waveform. It is preferred that this shift is performed to increase the synthesized torque.

The Inventors conceived of two techniques for increasing the synthesized torque. The first technique is to make both peaks of the fundamental component waveform (the second harmonics) 102 of the reluctance torque Tr and the fundamental component waveform (the first-order frequency) of the magnet torque Tm close to each other in FIG. 2A. To achieve this peak matching or closeness, FIG. 2A shows a shift of the waveform 102 to the left by an electrical angle of 45 degrees or thereabouts for increasing the synthesized torque.

The second technique is to make the peak of a waveform 103 of the third harmonic component of the magnet torque Tm close, as much as possible, to that of the waveform 102 of the fundamental component (the second harmonics) of the reluctance torque Tr in the phase domain. In the example shown in FIG. 2A, there is only an electrical angle of 15 degrees or thereabouts between the phases of these waveforms 103 and 102. Thus, a slight change in the phase angle between magnetic flux from the magnet-orienting magnetic poles and the magnetic flux from the magnetic salient poles results in an exact or approximate agreement of the peaks of both waveforms 102 and 103. This second technique is a phase shift technique that provides an increase to the synthesized torque, with its increase amount being not larger than that gained by the first technique However, the second technique is advantageous over the first one in that structural changes which should be given to the rotor to change the phase angle between both poles are fewer, because of a less amount of phase shift (e.g., 15 degrees to 45 degrees).

It is admitted that the technical concept that the phase angle between the circumferential central position of magnetic salient poles and a substantial circumferential central position of magnet-originating magnetic poles is shifted from an electrical angle of π/2 has not been known at all in the past, Of course, the advantages resultant from such a phase shift, namely, changing or increasing the synthesized torque, have not been known. Incidentally, the substantial circumferential central position of magnet-originating magnetic poles refers to a magnetically central position of magnet flux for one magnetic pole along the circumference of the rotor.

The features of the rotor according to the present embodiment will now be described, The first feature is that the soft-magnetism segment 13 is disposed between the two magnetic salient poles 15 so as to transmit and receive magnetic flux to and from the stator 3 and the paramagnet magnets 11 and 12 are disposed before and after the segment 13. This disposal makes it possible that the circumferential distribution (i.e., spatial waveform) of a magnet field (field from the magnets) emanating from the outer circumferential face of the segment 13 to the stator 3 approaches a trapezoidal shape. Hence this trapezoidal-shape magnetic distribution can have the third harmonic component as much as possible. As shown in FIG. 2B, both ends of this trapezoidal-shape magnetic distribution (spatial waveform) are higher in amplitude than its central portion, because the permanent magnets 11 and 12 are disposed at both ends in the circumferential direction. In addition, the permanent magnets 11 and 12 are disposed relatively near the outer circumferential surface of the rotor 1, whereby it is possible to reduce the amount of magnet (i.e., the amount of magnet material used to produce the permanent magnet) necessary for securing the amount of magnetic flux, compared to the conventional interior magnet type of rotor having the same specifications.

A second feature is to give the concave groove 19 to the central portion of the stator-facing surface of the segment 13, which central portion is located almost at the circumferential center between the magnetic salient poles. This concave groove 19 reduces the magnet flux at the circumferential central portion of the segment 13 (this circumferential position corresponds to the d-axis of the conventional IPM), so that the spatial distribution of the magnet flux is made into a steeper trapezoidal shape, including the higher-amplitude third harmonic component. The amount of magnet flux which is given from the segment 13 to the stator 3 is decided, to some extent, by the capacities of the permanent magnets 11 and 12. In the present embodiment, the segment 13 distributes this amount of magnet flux to circumferential front and rear portions to make the circumferential special distribution of the magnet flux into a trapezoidal shape. This means that the magnet flux has spatial harmonic components including the third harmonic component of higher amplitude. Hence, by using the phase shift, the toque generated by the machine can be changed or can be increased easily.

A third feature is that the rear permanent magnet 12 is flatter than the frontal permanent magnet 11 relative to the radial direction. This makes it possible that the magnet flux which is from the frontal permanent magnet 11 and received by a circumferential front portion of the segment 13 is larger in amount than the magnet flux which is from the rear permanent magnet 12 and received by a circumferential front portion of the segment 13 That is, as to the magnet flux transmitted to the stator 3, the circumferential front portion is larger than the circumferential rear portion. This means that the circumferential position through which the magnet flux is transmitted to the stator 3 is substantially (i.e., magnetically) shifted frontward from the circumferential center of the segment 13.

A fourth feature is that the frontal permanent magnet 11 is made larger in size than the rear permanent magnet 12 so that the frontal permanent magnet 11 gives a larger amount of magnet flux to the segment 13 than that from the rear permanent magnet 12. This also allows the substantial (i.e., magnetic) circumferential position of the magnet flux to be shifted forward from the circumferential center of the segment 13 in the circumferential direction.

As a result of the foregoing features, the trapezoidal distribution of the magnet flux along the outer circumferential surface of the rotor 2 is shifted forward from the original d-axis position by a predetermined angle Δθ in the circumferential direction, as illustrated in FIG. 1. In this description, the original d-axis position is defined as a position shifted in the circumferential direction by an electrical angle π/2 from the q-axis corresponding to the circumferential center between the magnetic salient poles 15, like the conventional IPM synchronous machine.

<Advantages>

In this way, compared to the circumferential central position between the magnetic salient poles 15, from the position of which the reluctance torque is substantially generated, the circumferential position from which the magnet torque is substantially generated is shifted forward from the original d-axis position Hence, from the viewpoint of the spatial waveform, the peak of the third harmonic component can be close to or can overlap the peak of the fundamental wave component (the second order) of the magnet torque It is therefore possible to increase the synthesized torque between the magnet torque and the reluctance torque by shifting the phase angle of the magnet torque by a little angle Δθ (which is for example 5-25 degrees, as detailed later). Though the structural changes and production steps of the rotor for the phase angle shift can be less, simplified, or suppressed from increasing, the synthesized torque can be increased.

For example, as shown in FIG. 2A, in the spatial frequencies, both the fundamental component (the second order) waveform 102 of the reluctance torque and the fundamental (the first order) component waveform 101 of the magnet torque are made to be close to each other or to be overlapped with each other. For achieving such a close or overlapped relationship between the peaks, the third-order waveform 101 of the magnet torque is shifted toward the fundamental component waveform 102 of the reluctance torque by an electric angel of 5-25 degrees (=Δθ), preferably nearly 15degrees This angel range of 5-25 degrees is decided in consideration of the fact that the phase difference between the second and third torque peaks are mostly present in the range of "15±10 degrees."

In the structure shown in FIG. 1, the paired spoke portions 16 and the paired connecting portions 17 mutually cooperate in mechanically supporting each segment from the yoke portion 14 and the magnetic salient poles 15. That is, part of the segment 13 which is between the paired connecting portions 17 is supported by the plural (e.g., two) spoke portions 16 at separate points in the circumferential direction, so that stress applied to the spoke portions 16 is distributed in the circumferential direction. Hence, it is possible to suppress the segment 13 from giving torsion force (which appears in the axial section) to the connecting portions 17 and the spoke portions 16 while the rotor 1 rotates. Further it is possible to raise the vibration resistance of the segment 13, The circumferential width between the paired spoke portions 16 is reduced as the axial distance advances axially outward. Hence, the backlash of the segment 13 can be reduced in the circumferential direction, also raising rigidity against vibration By the way, in the foregoing embodiment, the frontal and rear permanent magnets 11 and 12 are disposed at the positions which are closer to the outer circumference of the rotor 1 in the axial directions compared to the conventional IPM, and which are adjacent to the magnetic salient poles 15 in the circumferential direction. It was found that this magnet arrangement increases the spatial fundamental component as well as the spatial third harmonic component of the magnet flux to be provided to the stator 3. It is considered that this increase is caused thanks to a reduction in leakage components of the magnet flux and a shortened magnetic path along which the magnetic flux passes.

(Modifications)

Various modifications of the foregoing embodiment will now be described.

Figure 3:
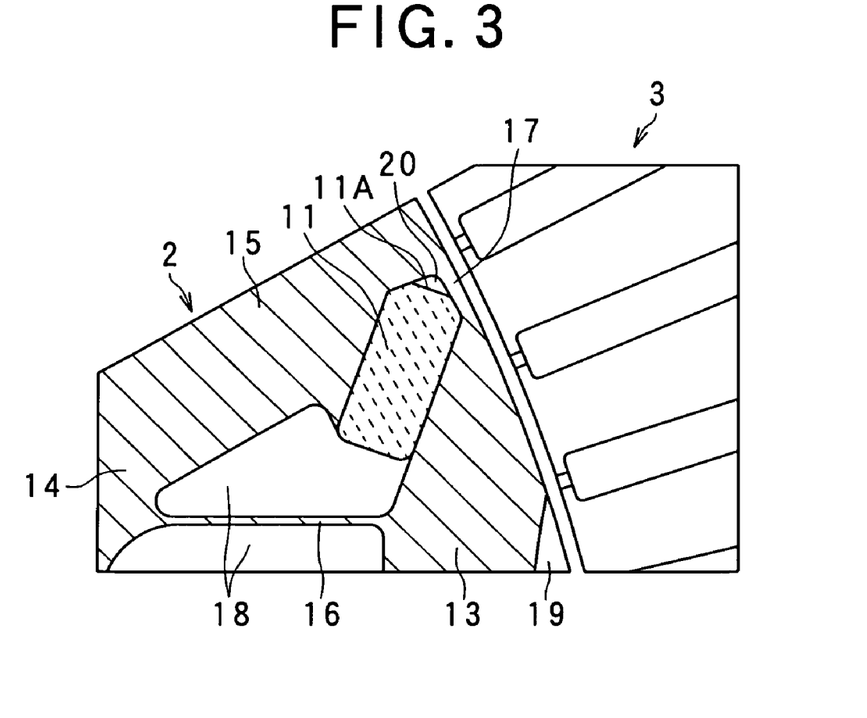
FIG. 3 is a partial cross-sectional view of an IPM type of synchronous machine according to a first modification of the first embodiment, which view is sectioned in the axial direction of the machine.

Referring to FIG. 3, a first modification will now be described, In this modification, an end 11A of the frontal permanent magnet 11 is chamfered to have a cut-off face, which end 11A faces the frontal one of the connecting portions 17. Hence, the end face 11A of the frontal permanent magnet 11 and the connecting portion 17, there is formed an air gap 20 which serves as a flux barrier to reduce leakage flux. In order to enable the frontal permanent magnet 11 to feed a larger amount of magnet flux to the stator 3, this air gap 20 is formed.

Figure 4:
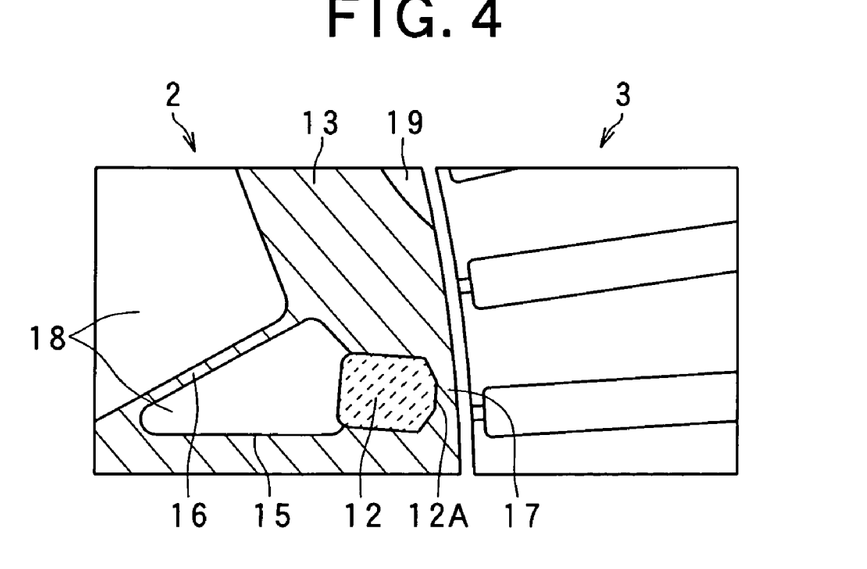
FIG. 4 is a partial cross-sectional view of an IPM type of synchronous machine according to a second modification of the first embodiment, which view is sectioned in the axial direction of the machine.

Referring to FIG. 4, a second embodiment will now be described.

In this modification, an end 12A of the rear permanent magnet 12 is chamfered to have a cut-off face, which end 12A faces the rear one of the connecting portions 17. Unlike the first modification, there is no air gap between the rear permanent magnet 12 and the connection portion 17 The reason is that there is no need to feed the magnet flux to the stator 3 so much from the rear permanent magnet. Hence, the rear connecting portion 17 can be thickened by a thickness corresponding to the chamfered amount, thus strengthening the support of the segment 13.

Figure 5:
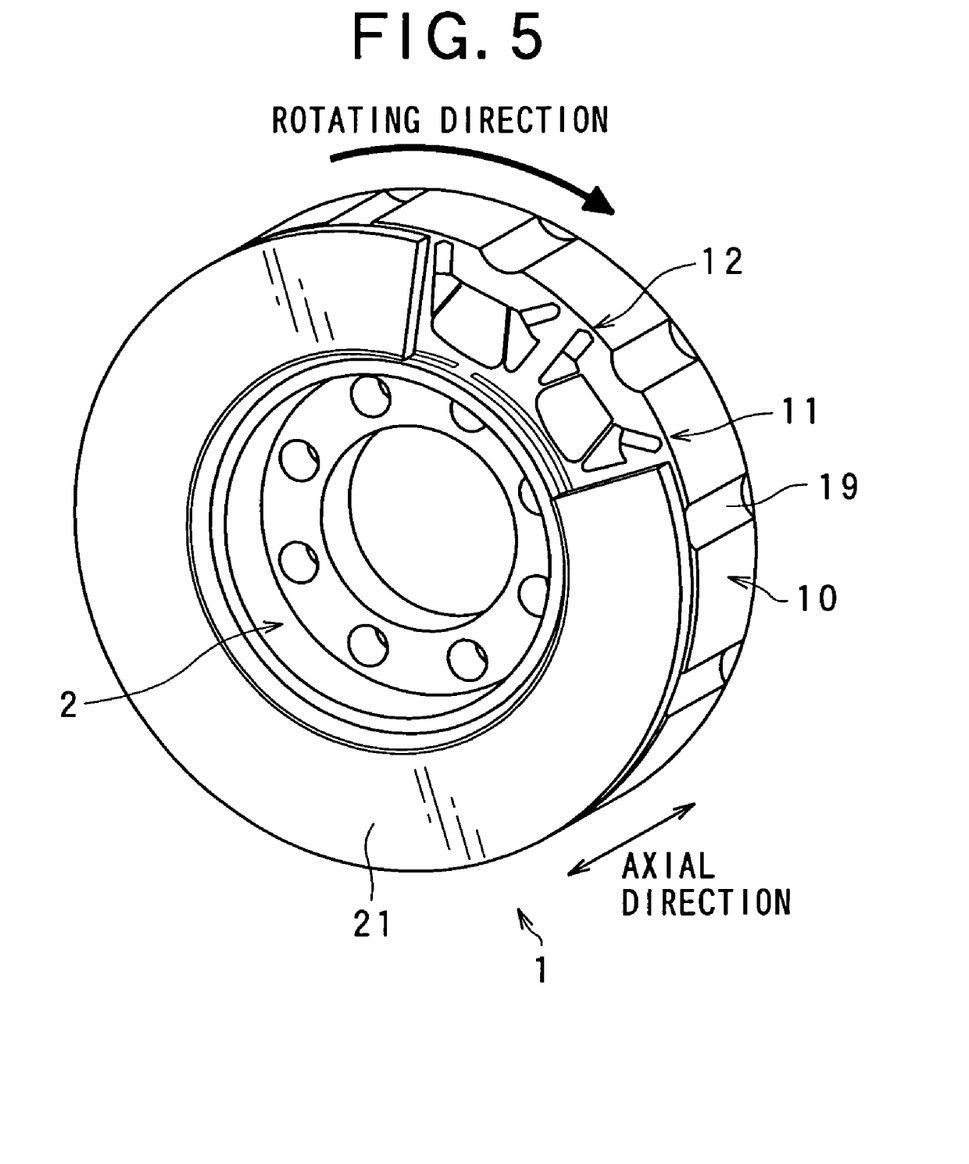
FIG. 5 is a partially cut perspective view of the rotor of an IPM type of synchronous machine according to a third modification of the first embodiment.

Referring to FIG. 5, a third embodiment will now be described.

In this modification, two non-magnetic disks 21 are placed on both axial ends of the rotor 1 without gap, though only one disk 21 is shown in FIG. 5. Each disk 21 has an outer diameter which is approximately equal to the outer diameter of the rotor core 10. The disks 21 support the permanent magnets 11 and 12 in the axial direction. In addition, the disks 21 prevent the rotor from having a large amount of imbalance, due to for example cooling medium partially retained in the non-magnetic portion between the yoke portions 14.

Referring to FIGS. 6-10, simulation results will now be described, which simulations were conducted by the inventors according to the present invention.

Figure 6:
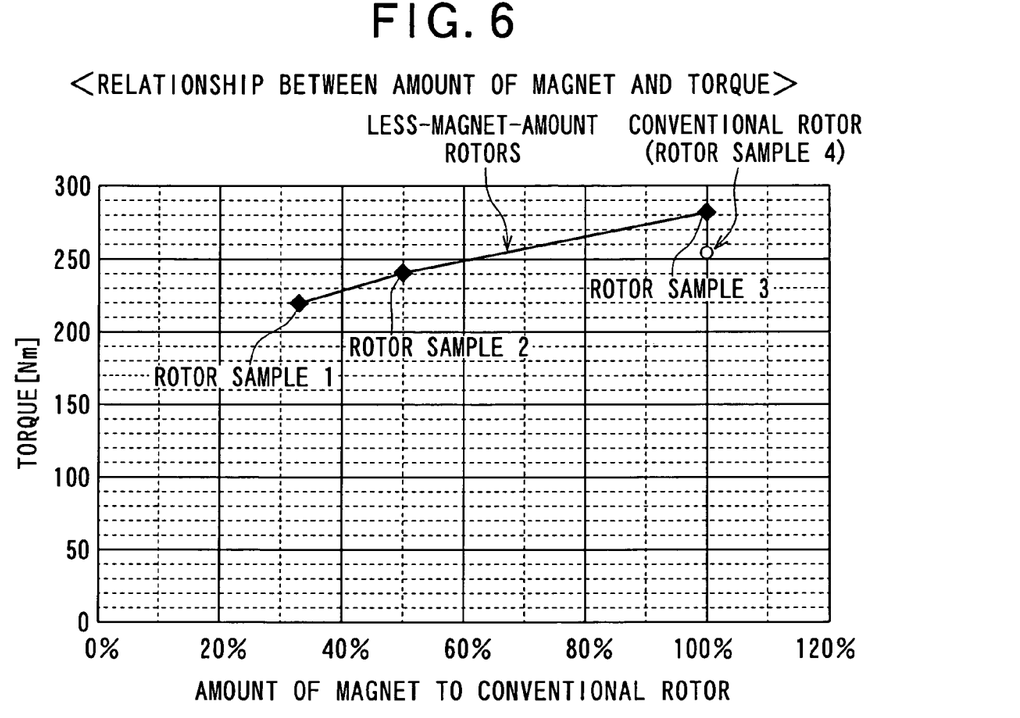
FIG. 6 shows simulation results showing different synthesized maximums of torque generated by various rotor samples whose amounts of magnet are changed.
Figure 7:
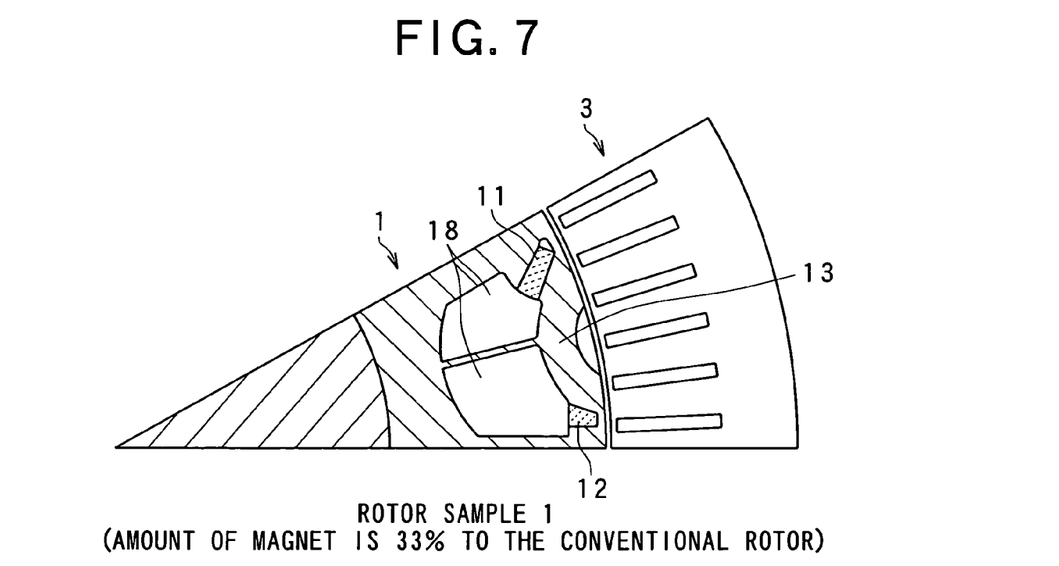
FIGS. 7-9 pictorially illustrate the structures of rotor samples 1 to 3 used in the simulation.
Figure 8:
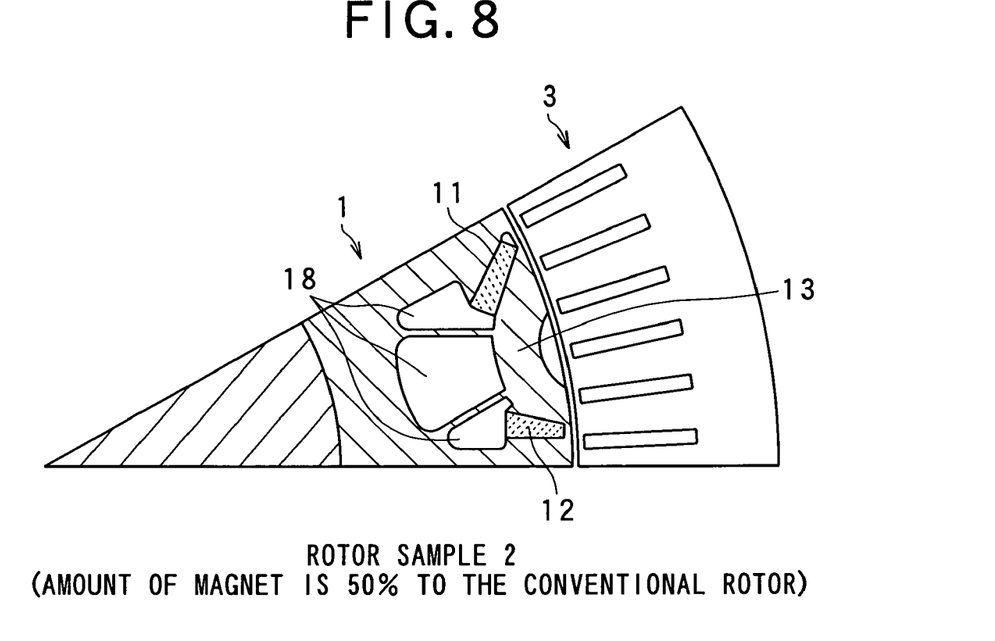
Figure 9:
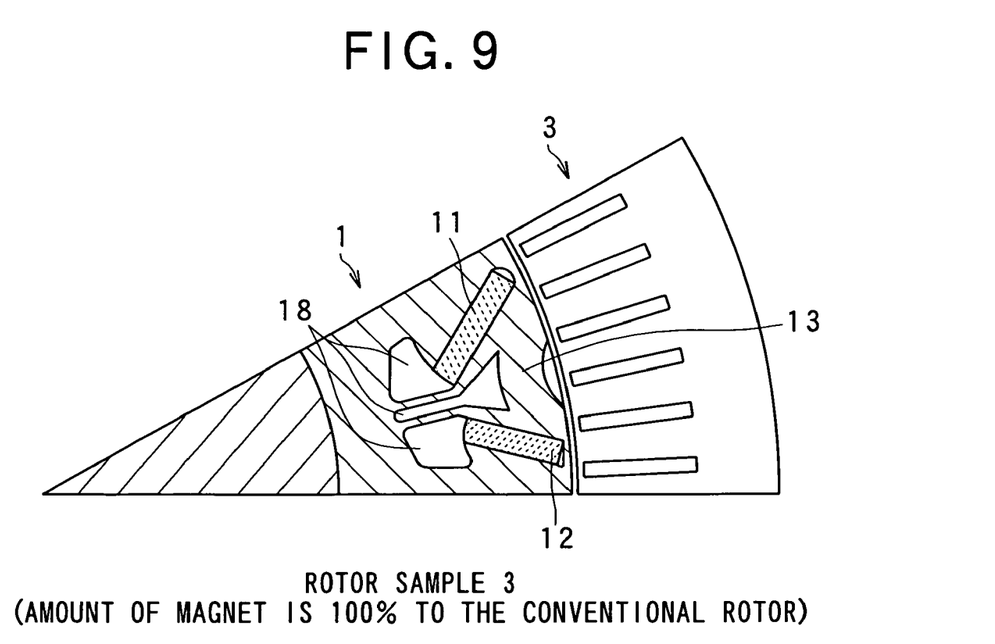
Figure 10:
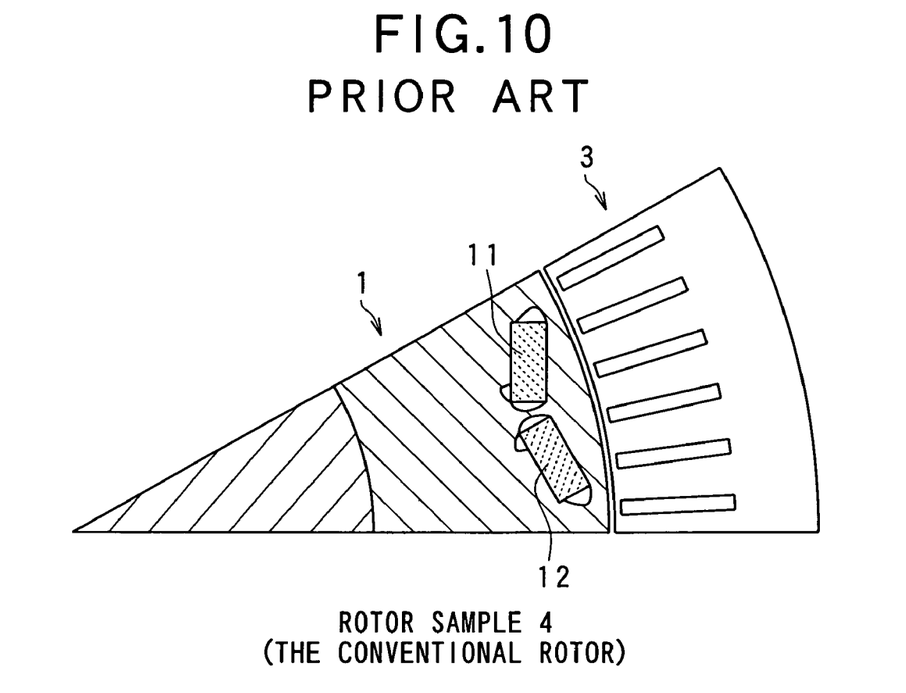
FIG. 10 pictorially illustrates the structure of a conventional rotor sample which is also used in the simulation for comparison.

The simulations were carried out using rotor samples with permanent magnets 11 and 12 of various dimensions. FIG. 6 shows the simulation results. In the simulation, the rotor samples 1 to 3, Hi which were structured according to the present invention, were given the same residual magnetic flux density, but given magnet amounts corresponding to 33%, 50% and 100% of the magnet amount of a conventional rotor 4, respectively, FIGS. 7-9 illustrate the structures of the rotor samples 1-3 according to the present invention, respectively. FIG. 10 illustrates the structure of the conventional rotor sample 4, in which there are two flux barriers between a yoke portion and a segment which are positioned between a pair of magnetic salient poles and a segment and two permanent magnets are disposed in the flux barriers, respectively.

The simulation results show that the rotor sample 3 is approximately equal in torque ripples to the conventional rotor sample 4 and is higher in torque than the conventional. Hence, when keeping the torque of the rotor sample 3 at the level provided by the conventional rotor sample 4, the magnet amount of the rotor sample 3 can be reduced more. Compared to the conventional rotor sample 4, the rotor samples 1 and 2 are comparatively higher in the torque, with respect to the fact that the amounts of the magnets were reduced, respectively, down to 33% and 50% of the conventional. As a result, by employing the structure according to the present invention, the amount of the magnet can be reduced when gaining the same torque or almost the same torque value In this respect, the rotor samples 1-3 can be called "less-magnet-amount rotors."

(Second Embodiment)

Figure 11:
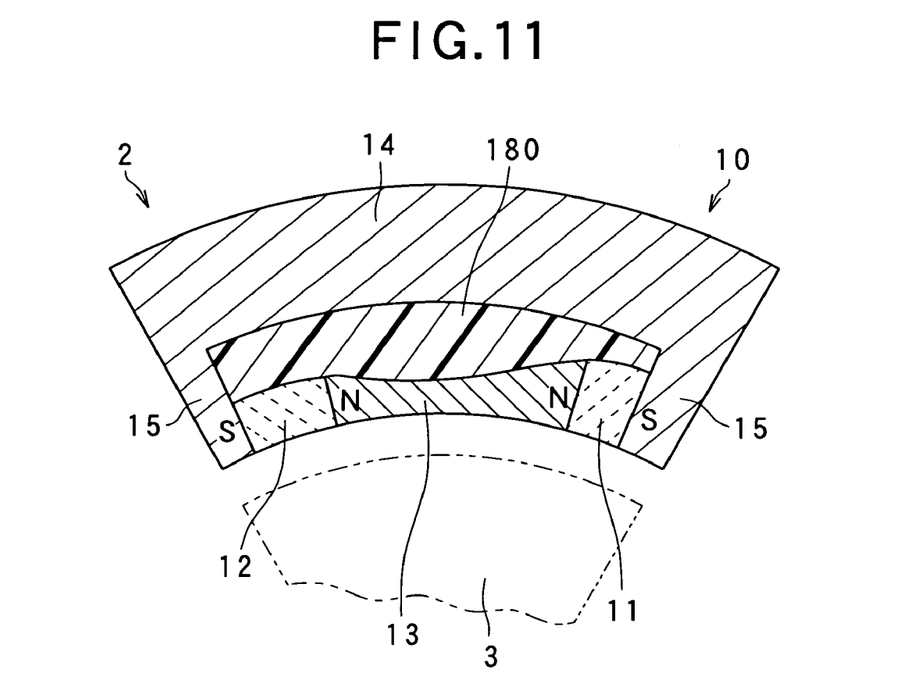
FIG. 11 is a partial cross-sectional view of an IPM type (and outer rotor type) of synchronous machine according to a second embodiment of the present invention, which view is sectioned in the axial direction of the machine.

Referring to FIG. 11, a second embodiment of the synchronous machine according to the present invention will now be described. In the present embodiment and subsequent embodiment, the identical or similar elements to those in the first embodiment are given the same reference numerals for the sake of avoiding a redundant description.

FIG. 11 shows a partial sectional view of a rotor 2 according to the present embodiment. This rotor 2 is structured Into an outer rotor. In this outer rotor structure, an inter-segment/yoke non-magnetic portion 180 formed within the rotor 2 is filled with resin serving as a non-magnetic material. This filling technique allows the portion 180 itself to support the segment 13 and the permanent magnets 11 and 12, largely improving tolerability for the centrifugal force.

That is, in the outer rotor structure, it is not necessary to take it into consideration so much the tolerance for the centrifugal force, so that the rotation performance in higher speeds can be improved largely.

(Third Embodiment)

Referring to FIGS. 12-15, a third embodiment of the synchronous machine according to the present invention will now be described.

Figure 12:
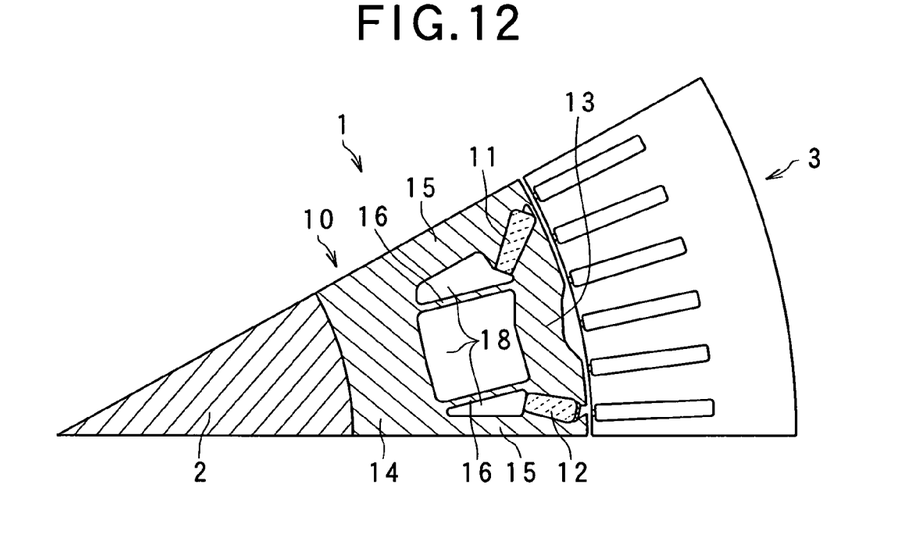
FIG. 12 is a partial cross-sectional view of an IPM type (and inner rotor type) of synchronous machine according to a third embodiment of the present invention, which view is sectioned in the axial direction of the machine.
Figure 14:
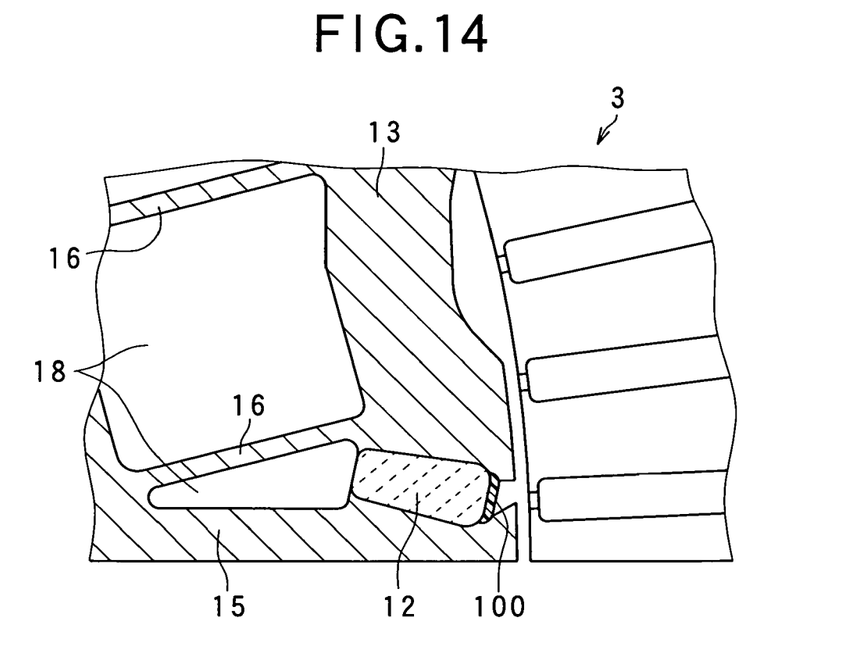
FIG. 14 is a partial enlarged view showing an area including a rear permanent magnet shown in FIG. 12.

In the present embodiment, the rear connecting portion is removed from the structure, so that the rear end of the segment 3 in the rotating direction is separated from the side of the tip end of the rear magnetic salient pole 15, as shown in FIGS. 12 and 14.

This separation structure prevents the segment 13 from generating tension stress therein by pulling the tip and rear ends of the segment 13 in the opposite directions respectively on account of a force caused in the rotation, It is thus possible to reduce the width of the frontal connecting portion 17 in the radial direction. Moreover, the flux leakage at the rear and of the segment 13 can be reduced, because of no connecting portion thereat.

Figure 13:
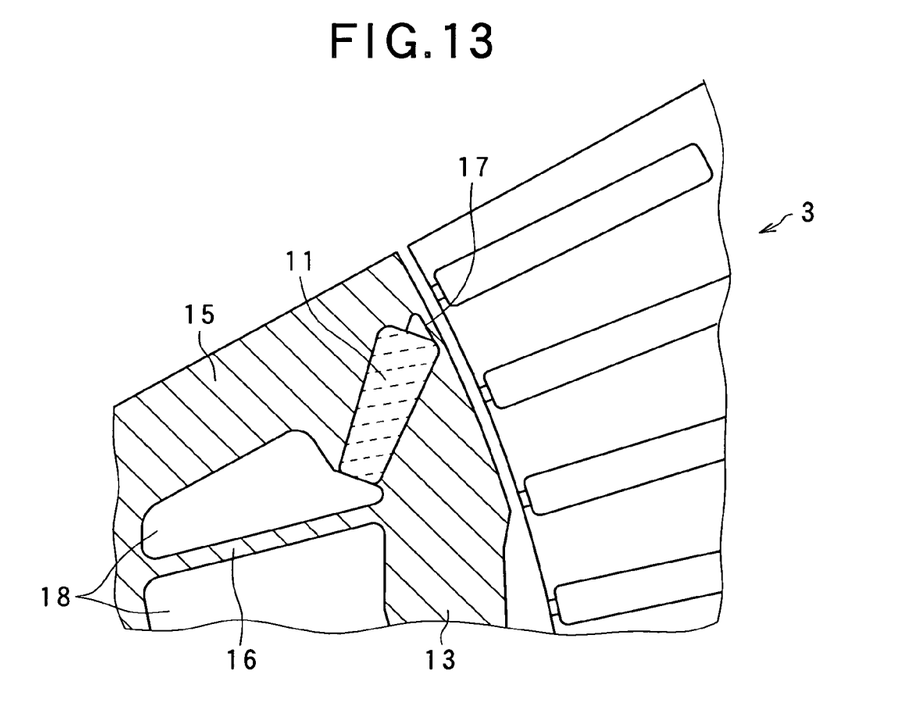
FIG. 13 is a partial enlarged view showing an area including a frontal permanent magnet shown in FIG. 12.

Further, as shown in FIGS. 13 and 14, the frontal and rear permanent magnets 11 and 12 are produced such that the widths of the magnets 11 and 12 in the circumferential direction become large little by little as the position advances in the axial direction. This gradual width-increasing structure can prevent the permanent demagnetization of magnet portions which are located close to an outer portion of each magnetic salient pole, which outer potion has a higher magnetic flux density. Moreover, it is possible to make the area of magnets larger, with their volumes maintained at the same amount, thus increasing the magnet torque.

Figure 15:
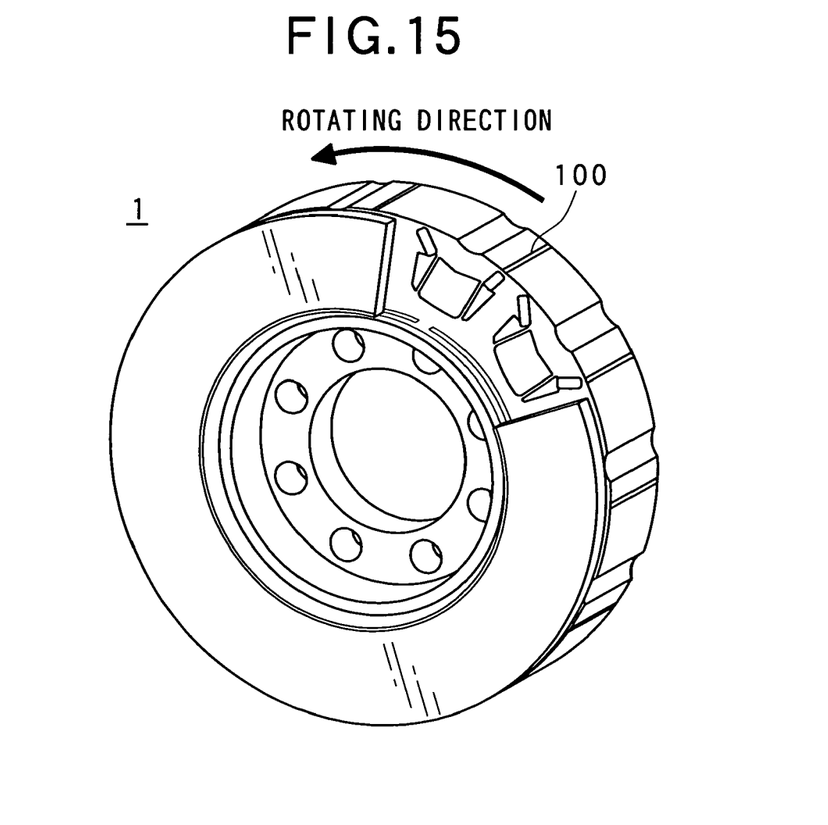
FIG. 15 is a partially cut perspective view of the rotor of the IPM type of synchronous machine according to the third modification.

In addition, as shown in FIGS. 14 and 15, a non-magnetic plate 100 is attached to the permanent magnet 12. This plate 100 prevents the permanent magnet 12 from flying out of the rotor due to the centrifugal force.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A synchronous machine comprising:
a stator having a cylindrical shape having an axial direction, a radial direction, and a circumferential direction;
a rotor that faces the stator and rotates on a shaft thereof in the circumferential direction, the rotor having magnetic salient poles that generate reluctance torque and magnet-originating magnetic poles that generate magnet torque by using permanent magnets embedded in the rotor; and
means for shifting a substantial central position of magnetic flux emanating from the permanent magnets in the circumferential direction by a predetermined angle $\Delta\theta$ of 5 - 25 degrees, from a reference position taken as a central position between each respective pair of adjacent magnetic salient poles, such that a maximum amplitude of a sum between a harmonic component of the magnet torque and the reluctance torque is changed from a maximum amplitude of a sum between the harmonic component of the magnet torque and the reluctance torque both obtained at the reference position without the shift.

2. The synchronous machine of claim 1, wherein the rotor provides the stator with magnet flux whose spatial waveform in the circumferential direction is a trapezoidal shape.

3. The synchronous machine of claim 2, wherein the rotor is structured as a rotor which rotates outside the stator.

4. The synchronous machine of claim 2, wherein the rear end of the segment in the rotating direction is separated from one of the magnetic salient poles located after the segment in the rotating direction.

5. The synchronous machine of claim 1, wherein the permanent magnets are two in number for each magnetic pole and magnetized to provide the magnet flux to the stator in the same direction toward the stator and the two permanent magnets are separated with a given distance therebetween in the circumferential direction.

6. The synchronous machine of claim 5, wherein the rotor comprises:
a soft-magnetism rotor core having an approximately cylindrical yoke portion fixed to a rotation shaft and magnetic salient poles protruding, every electrical angle of $\pi$, from a circumferential surface toward the stator in the radial direction,
a soft-magnetism segment positioned between, of the magnetic salient poles, paired magnetic salient poles mutually adjacent in the circumferential direction to extend along the stator in the circumferential direction, and
a non-magnetic portion positioned between base ends of the paired magnetic salient poles to separate the yoke portion from the segment by a predetermined width in the radial direction,
wherein the two permanent magnets consist of:
a frontal permanent magnet disposed between, of the paired magnetic salient poles, an axial end of a magnetic salient pole positioned before the segment in a rotating direction of the rotor and a front end of the segment in the circumferential direction, and
a rear permanent magnet disposed between, of the paired magnetic salient poles, an axial end of a magnetic salient pole positioned after the segment in the rotating direction of the rotor and a rear end of the segment in the circumferential direction, and wherein the segment is magnetized in the same direction by the frontal permanent magnet and the rear permanent magnet.

7. The synchronous machine of claim 6, wherein the segment has a concave groove formed on an outer circumferential surface thereof which faces the stator, wherein the concave groove is positioned closer to a circumferential rear end of the segment than a circumferential central position between the paired magnetic salient poles.

8. The synchronous machine of claim 6, wherein the segment has a circumferential frontal portion and a circumferential rear portion and the circumferential frontal portion is stronger than the circumferential rear portion in providing the stator with magnet flux.

9. The synchronous machine of claim 8, wherein the frontal permanent magnet provides the segment with the magnetic flux more than the magnetic flux provided to the stator by the rear permanent magnet.

10. The synchronous machine of claim 6, wherein the rear permanent magnet has a magnetic face and the frontal permanent magnet has a magnetic face whose angle to the radial direction is larger than an angle of the magnetic face of the rear permanent magnet to the radial direction.

11. The synchronous machine of claim 6, wherein the rotor core comprises spoke portions compose part of the non-magnetic portion and connect the segment and the yoke portion.

12. The synchronous machine of claim 11, wherein the spoke portions are plural in number for each magnetic pole of the machine and arranged at given intervals in the circumferential direction, and the segment is one in number for each magnetic pole of the machine and supported by the plural spoke portions.

13. The synchronous machine of claim 12, wherein the spoke portions are two in number for each magnetic pole of the machine and the two spoke portions provide a width therebetween in the circumferential direction and the width becomes smaller as advancing outward in the radial direction.

14. The synchronous machine of claim 6, wherein the rear end of the segment in the rotating direction is separated from one of the magnetic salient poles located after the segment in the rotating direction.

15. The synchronous machine of claim 6, wherein said central position between each respective pair of adjacent magnetic salient poles is at an electrical angle $\pi/2$ with respect to each said magnetic salient pole of the pair.

16. The synchronous machine of claim 6, wherein the rotor is structured as a rotor which rotates outside the stator.

17. The synchronous machine of claim 5, wherein the rotor is structured as a rotor which rotates outside the stator.

18. The synchronous machine of claim 5, wherein the rear end of the segment in the rotating direction is separated from one of the magnetic salient poles located after the segment in the rotating direction.

19. The synchronous machine of claim 1, wherein the rotor is structured as a rotor which rotates outside the stator.

20. The synchronous machine of claim 1, wherein the rear end of the segment in the rotating direction is separated from one of the magnetic salient poles located after the segment in the rotating direction.

\* \* \* \* \*